United States Patent
Toffle et al.

(10) Patent No.: US 6,775,088 B2
(45) Date of Patent: Aug. 10, 2004

(54) VERTICALLY-ORIENTED SERVO TRACK WRITER AND METHOD

(75) Inventors: Mark August Toffle, St. Louis Park, MN (US); Lon Richard Buske, Apple Valley, MN (US); Brent Melvin Weichelt, Burnsville, MN (US); Thomas Henry Sexton, Maple Grove, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 336 days.

(21) Appl. No.: 10/003,457

(22) Filed: Oct. 31, 2001

(65) Prior Publication Data

US 2002/0181138 A1 Dec. 5, 2002

Related U.S. Application Data

(60) Provisional application No. 60/295,275, filed on Jun. 1, 2001.

(51) Int. Cl.[7] .............................................. G11B 21/02
(52) U.S. Cl. ........................................................ 360/75
(58) Field of Search ................................ 360/75, 97.01, 360/97.03, 97.04, 55, 51, 77.02, 77.03, 77.08, 77.12, 137, 135, 265.6, 245.4; 384/100

(56) References Cited

U.S. PATENT DOCUMENTS

| | | | | |
|---|---|---|---|---|
| 4,458,280 A | * | 7/1984 | Cunningham | 360/125 |
| 4,737,869 A | * | 4/1988 | Sugaya et al. | 360/77.08 |
| 4,831,470 A | | 5/1989 | Brunnett et al. | 360/75 |
| 4,920,442 A | * | 4/1990 | Dimmick | 360/137 |
| 5,055,951 A | * | 10/1991 | Behr | 360/77.12 |
| 5,339,204 A | | 8/1994 | James et al. | 360/51 |
| 5,617,267 A | | 4/1997 | Kawagoe et al. | 360/77.02 |
| 5,642,943 A | | 7/1997 | Szeremeta | 384/100 |
| 5,774,294 A | * | 6/1998 | Fioravanti | 360/75 |
| 5,774,295 A | | 6/1998 | Tsai | 360/77.03 |
| 5,796,542 A | | 8/1998 | Szeremeta | 360/77.02 |
| 5,898,553 A | * | 4/1999 | Oyanagi et al. | 360/135 |
| 6,018,437 A | * | 1/2000 | Weichelt et al. | 360/97.01 |
| 6,128,165 A | * | 10/2000 | Baker et al. | 360/265.6 |
| 6,256,164 B1 | * | 7/2001 | Choi | 360/97.01 |
| 6,407,878 B1 | * | 6/2002 | Weichelt et al. | 360/97.01 |
| 6,545,844 B1 | * | 4/2003 | Schaenzer et al. | 360/245.4 |
| 6,590,732 B2 | * | 7/2003 | Kitagawa et al. | 360/75 |
| 6,631,046 B2 | * | 10/2003 | Szita et al. | 360/75 |

FOREIGN PATENT DOCUMENTS

JP          03 019184          1/1991

* cited by examiner

Primary Examiner—David Hudspeth
Assistant Examiner—Fred F. Tzeng
(74) Attorney, Agent, or Firm—Fellers, Snider, et al.

(57) ABSTRACT

A vertically-oriented servo track writer assembly and method for recording servo pattern on a disc surface includes a spindle hub assembly that rotates one or more discs in a substantially vertical plane and an actuator assembly that pivots an E-block about a substantially horizontal axis. The E-block includes one or more actuator arms and associated flexures, with each flexure including a servo recording head. Pivoting motion of the E-block moves each servo recording head in a substantially vertical plane adjacent a surface of an associated disc to record servo pattern information on the disc surface. The method further includes laterally moving the actuator assembly into and out of engagement with the spindle hub assembly to simplify loading and unloading discs from the spindle hub assembly.

15 Claims, 5 Drawing Sheets

VERTICALLY-ORIENTED SERVO TRACK WRITER AND METHOD

RELATED APPLICATIONS

This application claims priority of U.S. provisional application Serial No. 60/295,275, filed Jun. 1, 2001, which is herein incorporated by reference.

FIELD OF THE INVENTION

This application relates generally to magnetic disc drives and more particularly to a vertical multi-disc servo track writer assembly and method for recording servo patterns on information storage discs.

BACKGROUND OF THE INVENTION

Disc drives are data storage devices that store digital data in magnetic form on a rotating disc. Modem disc drives comprise one or more rigid information storage discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. During a write operation sequential data is written onto the disc track, and during a read operation the head senses the data previously written onto the disc track and transfers the information to an external environment. Important to both of these operations is the accurate and efficient positioning of the head relative to the center of the desired track on the disc. Head positioning within a desired track is dependent on head-positioning servo patterns, i.e., a pattern of data bits recorded on the disc surface and used to maintain optimum track spacing and sector timing. Servo patterns or information can be located between the data sectors on each track of a disc ("embedded servo"), or on only one surface of one of the discs within the disc drive ("dedicated servo"). Regardless of whether a manufacturer uses "embedded" or "dedicated" servos, the servo patterns are typically recorded on a target disc during the manufacturing process of the disc drive.

Recent efforts within the disc drive industry have focused on developing cost-effective disc drives capable of storing more data onto existing or smaller-sized discs. One potential way of increasing data storage on a disc surface is to increase the recording density of the magnetizable medium by increasing the track density (i.e., the number of tracks per millimeter). Increased track density requires more closely-spaced, narrow tracks and therefore enhanced accuracy in the recording of servo-patterns onto the target disc surface. This increased accuracy requires that servo-track recording be accomplished within the increased tolerances, while remaining cost effective.

Servo patterns are typically recorded on the magnetizable medium of a target disc by a servo-track writer ("STW") assembly during the manufacture of the disc drive. One conventional STW assembly records servo pattern on the discs following assembly of the disc drive. In this embodiment, the STW assembly attaches directly to a disc drive having a disc pack where the mounted discs on the disc pack have not been pre-recorded with servo pattern. The STW essentially uses the drive's own read/write heads to record the requisite servo pattern directly to the mounted discs. An alternative method for servo pattern recording utilizes a separate apparatus having dedicated servo recording transducers or heads for recording servo pattern onto one or more discs. The dedicated servo recording heads can be used to record servo information to a number of discs simultaneously, which are subsequently loaded into the disc drive for use. In light of the trend toward higher track density, there is a demand for dedicated STW assemblies that are capable of recording servo patterns simultaneously to multiple discs for high density disc drives.

Conventional dedicated STW assemblies are oriented in a horizontal direction with the discs mounted in a horizontal plane. Such dedicated STW assemblies typically utilize one or more actuator arms having one or more transducers or heads on each arm which, in turn, move in a horizontal plane along a radius of the magnetizable medium on the target disc. That is, conventional dedicated STWs have both discs and actuator arms that rotate in a horizontal plane about a vertical STW bearing axis so that a head at a distal end of each actuator arm moves in a horizontal path across the disc surface.

Shortcomings of the prior art horizontally-oriented STW assemblies include disc alignment errors and imperfections in the recording system resulting from the horizontal orientation of both the discs and the actuator arms, as well as the flexible "suspensions" connecting the servo-writing heads to the actuator arms. Specifically, while the discs are formed from a relatively stiff metal material, the discs are nonetheless subject to gravity-induced warping, particularly along the outer circumference of the discs. Even miniscule amounts of gravity-induced disc warpage can lead to unacceptable servo-writing errors, particularly in light of the higher track densities demanded by current disc drive users.

Accordingly, improvements in servo pattern recording accuracy are required by dedicated STW assemblies as well as improvements in the time it takes to manufacture discs having the appropriate servo pattern. The present invention provides a solution to this and other problems, and offers other advantages over the prior art.

SUMMARY OF THE INVENTION

The present invention relates to a vertically-oriented servo track writer assembly for recording servo pattern information on a disc for use within a disc drive.

In accordance with one embodiment of the present invention, the servo track writer assembly has a spindle hub assembly including a hub supporting the disc in a substantially vertical plane for rotation at a predetermined rate. An actuator assembly includes an E-block and a motor for rotating the E-block about a substantially horizontal axis which, in turn, rotates an actuator arm and a flexure in a substantially vertical plane. A servo recording head is mounted to a distal end of the flexure so that the head moves in a substantially vertical plane along a surface of the disc to record the servo pattern information on the disc surface.

The servo track writer assembly preferably supports a plurality of discs stacked on the spindle hub assembly, and the E-block preferably includes a plurality of actuator arms and attached flexures to provide simultaneous recording of servo pattern information on each of the vertically-oriented discs. The servo track writer assembly may also include a platform and a slide mechanism coupling the actuator assembly to the platform to allow lateral movement of the actuator assembly between a first position wherein the actuator arms engage the discs for writing servo pattern information, and a second position wherein the plurality of actuator arms are laterally spaced from the plurality of discs.

The present invention can also be implemented as a method of recording servo pattern information on a disc in a vertically-oriented servo track writer assembly, where the method includes the steps of positioning the disc on a substantially horizontally-oriented spindle hub assembly and activating the spindle hub assembly to rotate the disc in a substantially vertical plane. A further step includes pivoting an E-block of an actuator assembly about a substantially horizontal axis to rotate an actuator arm and an attached flexure along an arcuate path in a substantially vertical plane adjacent a surface of the disc. A servo recording head is then signaled to record servo pattern information on the surface of the vertically-oriented disc.

The present invention can further be implemented as a servo track writer assembly having means for moving a servo recording head in a substantially vertical plane to record servo pattern information on a surface of a disc while rotating the disc in a substantially vertical orientation. The servo track writer assembly may also include means for simultaneously recording servo pattern information on a plurality of discs rotating in a substantially vertical orientation. In one preferred embodiment, the servo track writer assembly includes means for selectively engaging and disengaging the plurality of servo recording heads from the plurality of discs while the vertically-oriented discs are rotating.

These and various other features as well as advantages which characterize the present invention will be apparent from a reading of the following detailed description and a review of the associated drawings.

DETAILED DESCRIPTION

Figure 1:
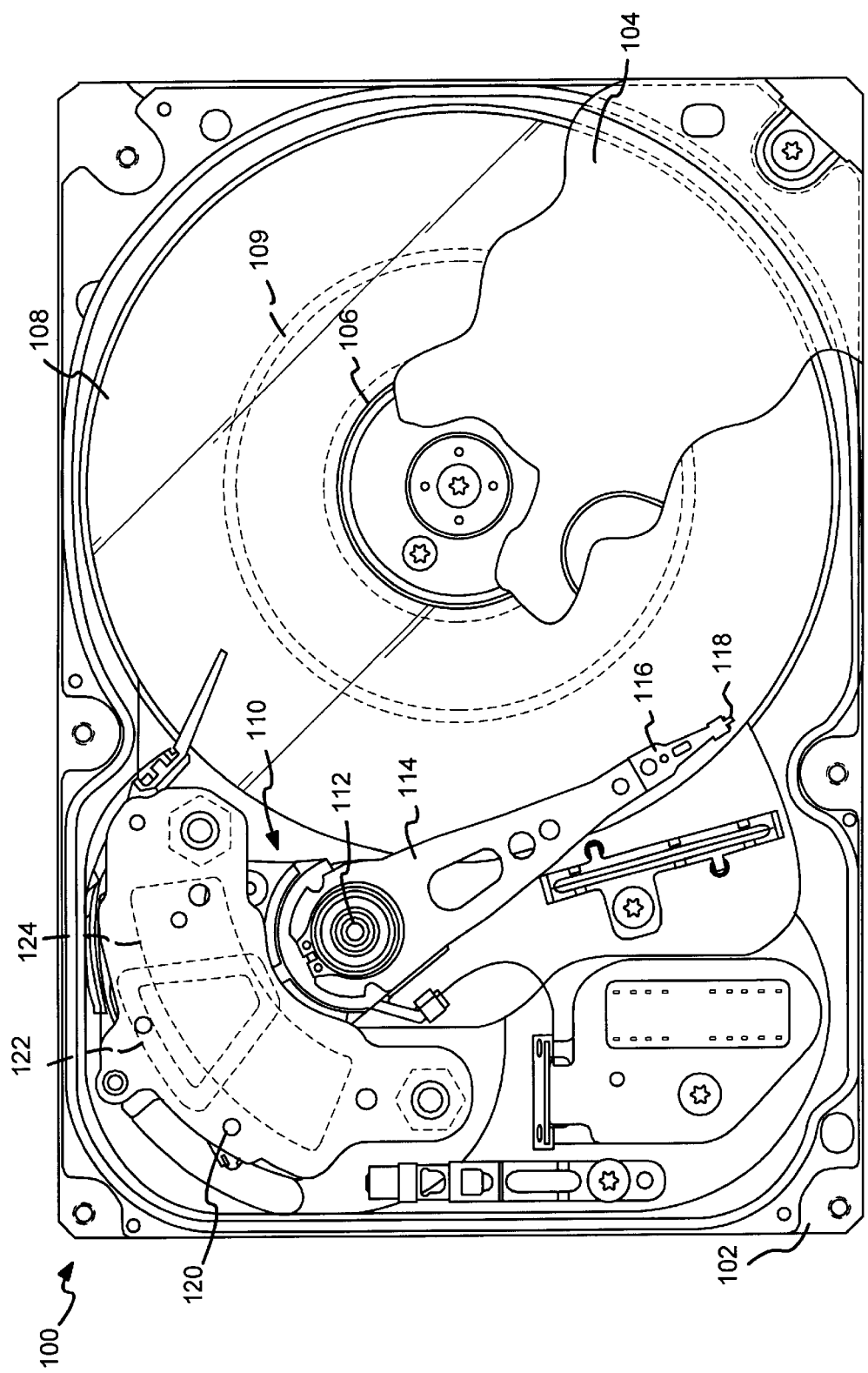
FIG. 1 is a top plan view of a disc drive assembly manufactured using an embodiment of the present invention.

A disc drive 100 manufactured in accordance with an embodiment of the present invention is shown in FIG. 1. The disc drive 100 includes a base 102 to which various components of the disc drive are mounted. A top cover 104, shown partially cut away, cooperates with the base 102 to form an internal, sealed environment for the disc drive 100 in a conventional manner. The components include a spindle motor 106 which rotates one or more discs 108 at a constant high speed. Information is written to and read from tracks, as illustrated by broken line 109, on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of the flexures 116 is a head 118 which includes an air bearing slider (not shown) enabling the head 118 to fly in close proximity above the corresponding surface of the associated disc 108.

Radial positioning of the heads 118 is controlled through the use of a voice coil motor 120, which typically includes a coil 122 attached to the actuator assembly 110, as well as one or more permanent magnets 124, which establish a magnetic field in which the coil 122 is immersed. The controlled application of current to the coil 122 causes a magnetic interaction between the permanent magnets 124 and the coil 122 so that the coil 122 moves in accordance with the well known Lorentz relationship. As the coil 122 moves, the actuator assembly 110 pivots about the bearing shaft assembly 112 and the heads 118 are caused to move across the surfaces of the discs 108.

Movement and positioning of the heads 118 over the disc surface relies upon pre-recorded servo information or "servo pattern" on the disc. Servo pattern provides information that specifies the radial positions of the heads, which information is then compared to the desired head position, allowing for appropriate signals to be sent to move the heads 118 accordingly. There are two types of servo pattern commonly used in conventional disc drives: dedicated servo, i.e., a dedicated disc or servo disc used exclusively for servo information, and embedded servo, i.e., servo information regularly interspaced on a disc where a head following a disc track is regularly reading servo pattern to control its position. As will be clear from the discussion that follows, either type of servo pattern can be recorded onto a target disc using the methods and apparatus of the present invention.

Figure 2:
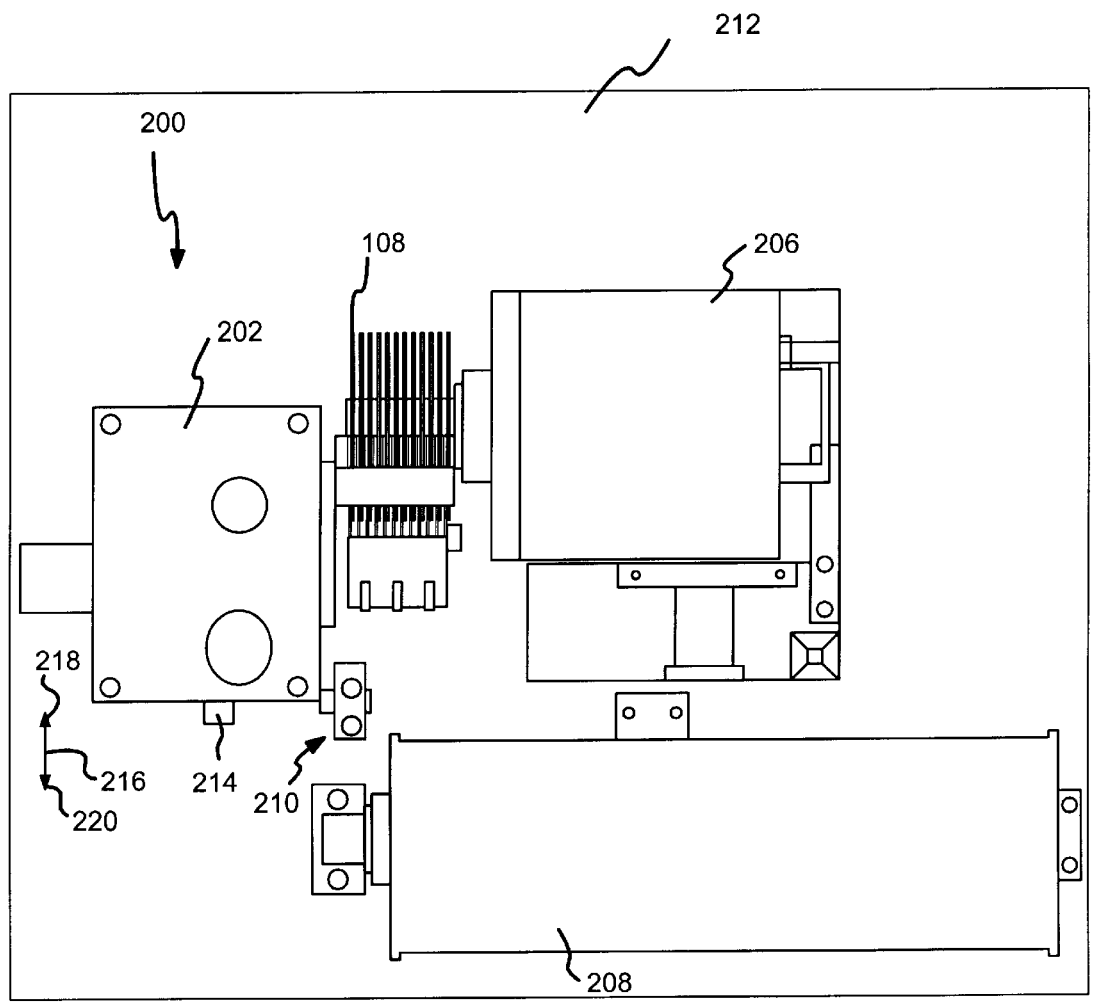
FIG. 2 is a top view of a vertically oriented servo-track writer illustrating an actuator assembly and a spindle motor rotatably supporting a plurality of vertically oriented discs in accordance with an embodiment of the present invention.
Figure 3:
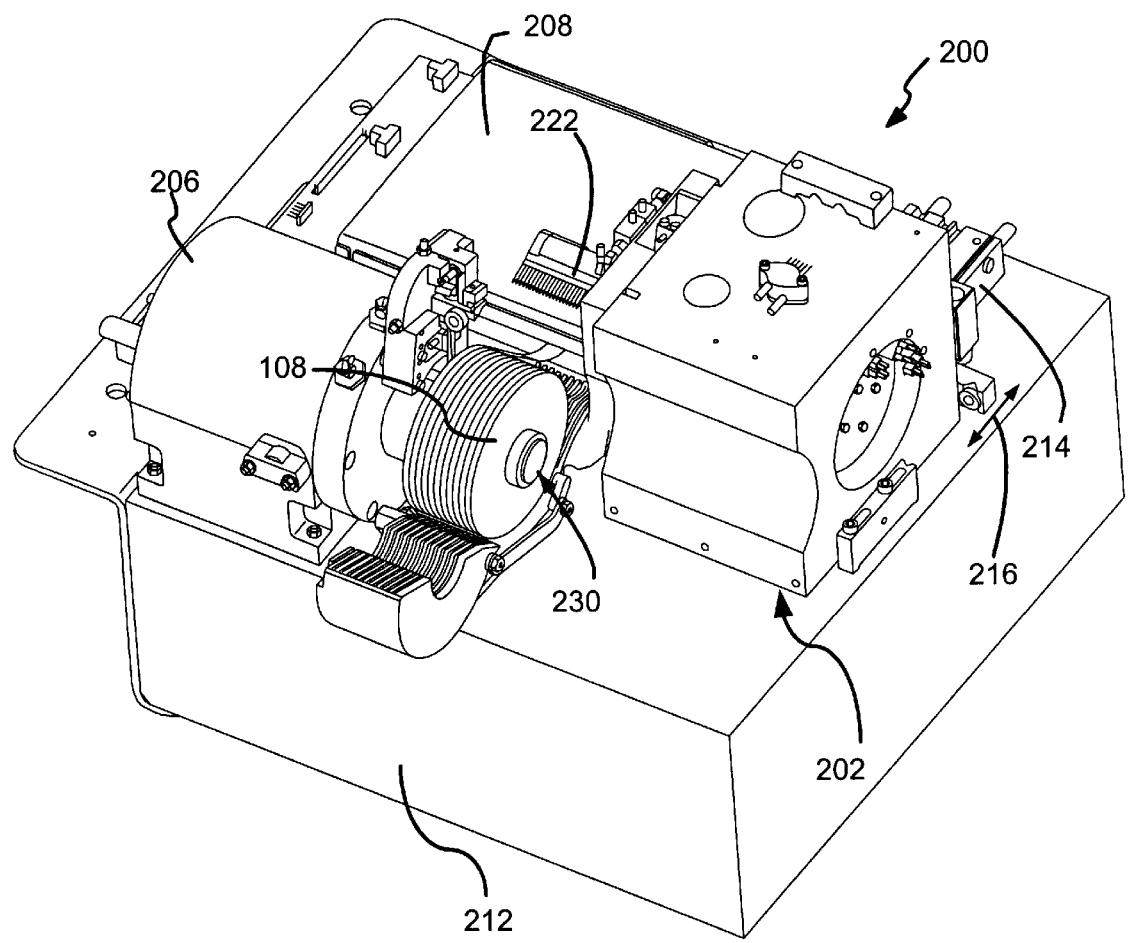
FIG. 3 is a perspective view of the vertically oriented multi-disc servo-track writer shown in FIG. 2 illustrating the actuator assembly and the spindle motor in a disc load/unload position.
Figure 4:
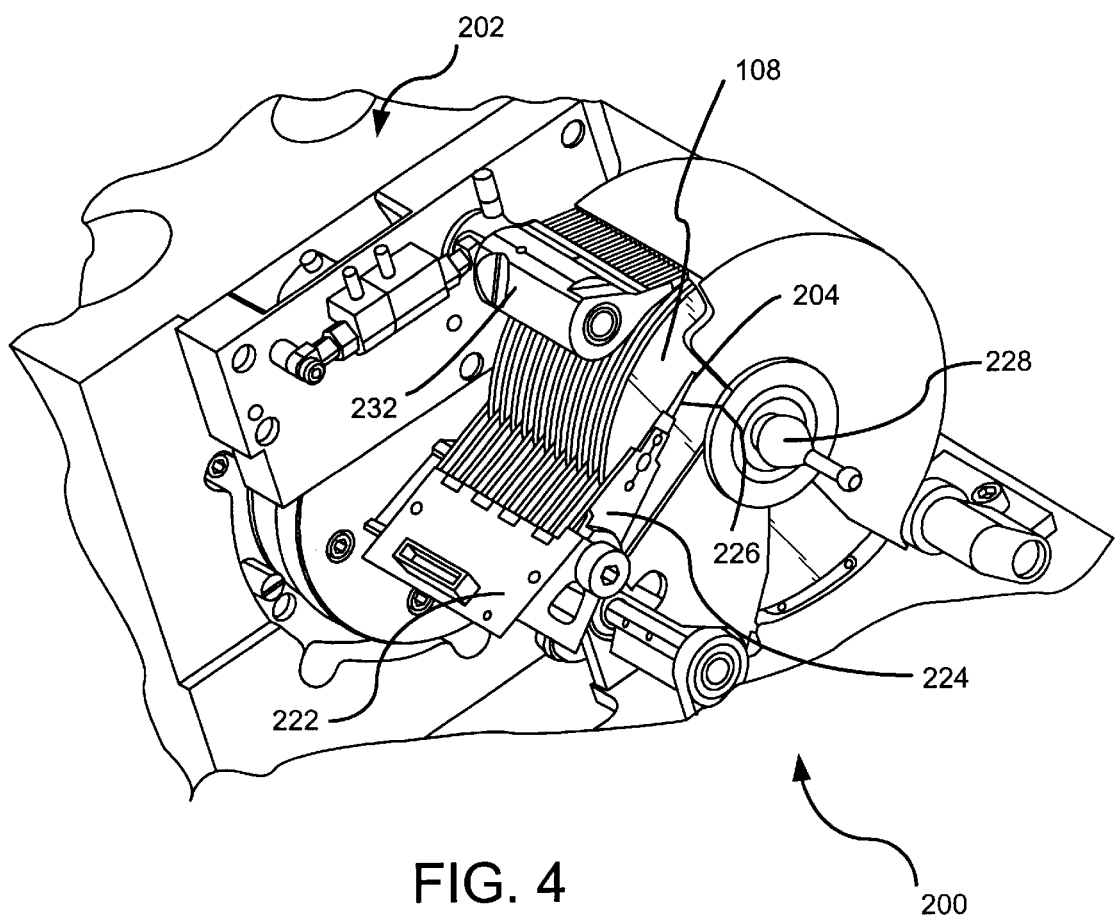
FIG. 4 is a perspective view of the actuator assembly of FIG. 2 engaging the plurality of vertically oriented discs on a spindle motor hub assembly, wherein the spindle motor has been removed for purposes of clarity.

The present invention provides a dedicated, vertically oriented, multi-disc servo track writer ("STW") for the accurate positioning and movement of servo recording heads during servo pattern recording on a disc as well as a method for recording servo pattern to a disc. FIGS. 2–4 illustrate a multi-disc STW 200 in accordance with one embodiment of the present invention. The vertically-oriented STW 200 includes an actuator assembly 202 for providing rotating servo recording heads 204 (see FIG. 4) necessary for recording servo pattern onto a target disc 108; a spindle motor hub assembly 206 for vertically positioning one or more target discs 108 onto which the servo pattern is to be recorded; a vacuum chuck 208 for rigidly securing the actuator assembly 202 in a desired position for servo track writing; and a laser interferometer 210 for measuring the angular displacement and consequent positioning of the servo-recording heads 204 of the actuator assembly 202 for servo pattern recording.

FIG. 2 illustrates that the entire multi-disc servo writer 200 sits upon a substantially immobile and horizontally positioned platform or base 212. The platform 212 is substantially resistant to movements from impact type collisions and is preferably a granite slab or other like material having sufficient size to support all the components of the STW 200. The actuator assembly 202 is connected to the platform 212 via a slide mechanism 214 for lateral movement (as indicated by arrow 216) over the platform 212 between a servo recording position 218 and a disc loading and unloading position 220, as is discussed in greater detail below. The spindle motor hub assembly 206 and vacuum chuck 208 are directly and non-moveably secured to the platform 212.

Contrary to prior art STWs, the actuator assembly 202 and the spindle hub assembly 206 of the STW 200 are both vertically oriented. Thus, the plurality of discs 108 secured to the spindle hub assembly 206 are vertically positioned relative to the platform 212. It is believed that the substantially vertical orientation of the discs 108 improves the accuracy of the servo pattern that is written to each of the discs by the STW 200, as explained in greater detail below. Similarly, the actuator assembly 202 includes an E-block 222 having a plurality of actuator arms 224 (FIG. 4) that are also arranged for movement in substantially vertical planes relative to the platform 212. Each actuator arm 224 includes one or more flexures 226 connecting a distal end of the actuator arm to a corresponding one of the servo-writing heads 204. The vertical orientation of the actuator arms 224 also increases the accuracy of the servo writing process as described below.

FIG. 3 illustrates the STW 200 in the load/unload position 220 where the actuator assembly 202 has been moved away from the spindle hub assembly 206 via the slide mechanism 214. In this position, a stack of discs 108 may be loaded onto spindle hub assembly 206 to start the servo writing process. In a preferred embodiment of the invention, the spindle hub assembly 206 may include a detachable spindle hub 228 (FIG. 4) so that the hub 228 and the stack of discs 108 may be detached from a spindle motor (not shown in FIG. 4) to ease the process of loading and unloading the discs 108 from the spindle hub 228. However, it is noted that the present invention is not limited to the use of a detachable spindle hub 228.

Once the discs 108 have been loaded on the spindle hub assembly 206 with a predetermined gap between adjacent discs, the discs 108 are secured to the spindle hub assembly 206 by means of a clamp ring 230 (FIG. 3). The actuator assembly 202 is then preferably moved laterally along the platform 212 (in the direction of arrow 216) toward the spindle hub assembly 206. While the flexures 226 on each of the actuator arms 224 tend to bias their corresponding heads 204 as is well known in the art, a comb 232 (FIG. 4) is preferably used to maintain proper separation between the heads 204 so that the actuator assembly 202 and the disc stack on the spindle hub assembly 206 may merge without unintentional contact between the heads 204 and the discs 108. The comb 232 preferably moves together with the actuator assembly 202 as shown in FIG. 4 and acts to separate the heads 204 against the bias force of the flexures 226. Once the actuator assembly 202 is locked into the servo writing position 218 so that the heads 204 are positioned within the gaps between the adjacent discs 108, the comb 232 is rotated away from the E-block 222 to allow the heads 204 to engage their respective discs as a result of the bias force provided by the flexures 226. Of course, the heads 204 do not make physical contact with the data regions of their respective disc surfaces. Rather, the spindle hub assembly 206 is activated to spin the discs 108 at a predetermined rate prior to disengaging the comb 232. As described above, the rotational motion of the discs 108 generates wind so that the heads 204 ride an air bearing in lieu of actually contacting the disc surface. This air bearing counters the bias force applied by the flexures 226 and protects the fragile magnetic coatings on the disc surfaces.

Once the comb 232 is removed so that the heads 204 are fully engaged with their respective discs 108, servo writing signals are applied to the heads 204 to begin the process of recording the servo pattern. During the recording process, the E-block 222 is rotated about a horizontal axis by a motor and bearing assembly within the actuator assembly 202 so that the heads 204 move radially across the surface of their respective discs 108. The position of the heads 204 is determined by the laser interferometer 210 which utilizes interferometric techniques to track movement of the heads along the disc radius, and the interferometer 210 sends position signals back to control the operation of the actuator assembly 202 and thus the radial position of the heads 204.

Upon completion of the servo writing process, the E-block 222 is rotated back to position the heads 204 adjacent an outer circumference of the discs 108, while the comb 232 is rotated into contact with the flexures 226 to disengage the heads 204 from the discs 108. The actuator assembly 202 is then moved laterally away from the spindle hub assembly 206 to the load/unload position 220 so that the discs 108 (complete with their newly written servo patterns) can be removed from the spindle hub assembly 206 and ultimately installed in the disc drive 100.

The vertical orientation of the actuator assembly 202 provides an important benefit over prior art (horizontally-oriented) STWs since the force of gravity does not act to pull the heads 204 downward. This is important both during the loading and unloading of the heads 204 onto the discs 108 as well as during the servo writing process itself. For instance, while the comb 232 acts to separate the heads 204 prior to the loading process, it is noted that the comb 232 typically contacts the flexures 226 rather than the fragile heads 204 located at a distal end of the flexures 226. Thus, with horizontally-oriented STWs, the force of gravity may tend to pull the heads 204 downward below the level of the individual comb arm or tine, thereby creating a danger of inadvertent contact between the hanging head 204 and the disc 108 prior to the disengagement of the comb 232 from the flexures 226. This danger is avoided in the current invention since the force of gravity does not tend to pull the heads 204 in the direction of the discs. Additionally, during the servo writing process utilizing the present invention, the force of gravity does not tend to pull the heads 204 either toward or away from their respective disc surfaces as in the prior art. That is, in a horizontally-oriented STW, half of the heads are typically positioned adjacent a top surface of a disc, while the other half of the heads are positioned adjacent a bottom surface of a disc. For those heads positioned above their respective discs, the force of gravity on the flexure 226 and the head 204 is combined with the preload force generated by the flexure 226, while for those heads positioned below their respective discs the force of gravity acts against the preload force. This dichotomy can create fluctuations in the preload force for the different heads within the STW which ultimately leads to discrepancies in the "fly height" of the head over the disc surface. While the preload force provided by the flexure is typically much greater than the weight of the flexure and head combined, even minor discrepancies in the fly height of the head during the servo writing process can lead to errors in the servo pattern.

In addition to the above-described benefits relating to the substantially vertical orientation of the actuator assembly 202 (i.e., the movement of the actuator arms 224, the flexures 226 and the heads 204 in a vertical plane), the substantially vertical orientation of the discs 108 on the spindle hub assembly 206 also provides benefits over prior art horizontally-oriented STWs. Specifically, while the discs 108 are formed from a relatively stiff material (such as aluminum), the discs are nonetheless subject to gravity-induced warping, particularly along the outer circumference of the discs. As described above, even miniscule amounts of disc warpage can lead to unacceptable servo-writing errors, particularly in light of the higher track densities utilized with the discs. However, by maintaining the discs 108 in a vertical orientation during the servo writing process, the force of gravity does not act to pull the disc surface from its nominal vertical plane. Thus, the vertical orientation of the STW 200 of the present invention (i.e., the substantially vertical orientation of both the actuator assembly 202 and the discs 108) provides a number of benefits over prior art horizontally-oriented STWs.

Figure 5:
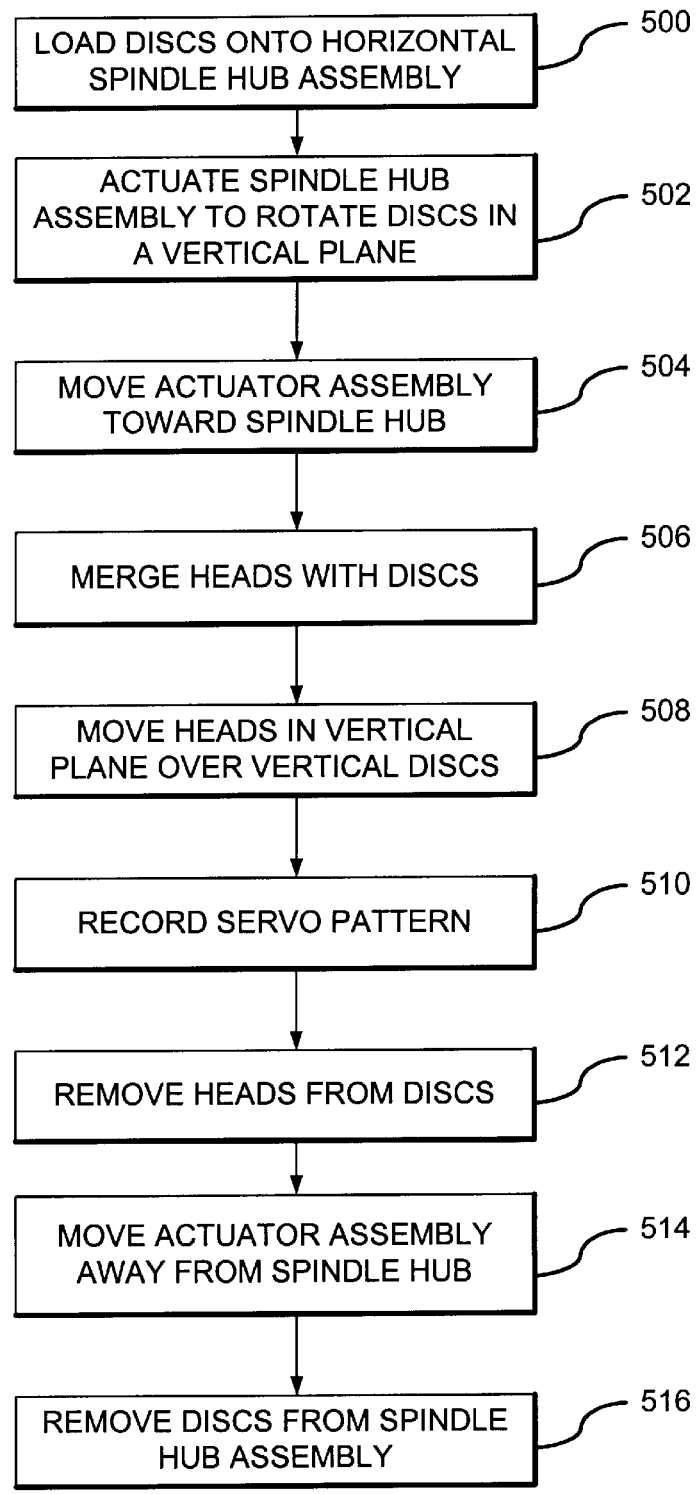
FIG. 5 is a flow diagram showing the steps for writing servo pattern on discs in a vertically-oriented servo-track writer in accordance with a preferred embodiment of the present invention.

A flow chart of the steps involved in recording servo pattern to a target disc for use in a disc drive in accordance with one embodiment of the present invention is shown in FIG. 5. In operation 500, one or more discs 108 are loaded onto a horizontally oriented spindle hub assembly 206 so that each disc 108 extends in a substantially vertical plane. In operation 502, the spindle hub assembly 206 is actuated to rotate the discs 108 for servo-track writing. In operation 504, an actuator assembly 202 is moved into position relative to the spindle hub assembly 206 for servo-track writing, wherein the actuator assembly 202 includes a plurality of actuator arms 224 oriented for movement in a substantially vertical plane. In operation 506, servo-writing heads 204 located at a distal end of each of the actuator arms 224 are merged with their respective discs 108, such as by the removal of a comb 232 which was previously used to separate the heads 204 from one another. In operation 508, the actuator assembly 202 moves the actuator arms in a vertical plane over the surfaces of the discs 108, such as by rotating an E-block 222 attached to a proximal end of each of the actuator arms 224 about a horizontal access. In operation 510, the heads 204 are signaled by known servo-track writer circuitry to write servo pattern on each of the disc surfaces in a manner that is well known in the art. In operation 512, the actuator assembly 202 moves the heads 204 away from the discs 204 (such as by rotating the E-block 222) upon receiving a signal that the servo-pattern is complete for the disc or discs. As part of operation 512, the comb 232 may be merged with the actuator arms 224 or flexures 226 of the actuator assembly 202 to prevent the heads 204 from contacting one another. In operation 514, the actuator assembly 202 is moved away from the spindle hub assembly 206 to allow for easy removal of the discs 108 from the spindle hub assembly 206. In operation 516, the discs 108 having newly recorded servo pattern are removed from the spindle hub assembly 206 and optionally installed in a disc drive 100.

In summary, a servo track writer assembly (such as 200) for recording servo pattern information on a disc (such as 108) in accordance with an exemplary preferred embodiment of the present invention has a spindle hub assembly (such as 206) including a hub (such as 228) supporting the disc (such as 108) in a substantially vertical plane and a motor for rotating the hub and the attached disc at a predetermined rate. An actuator assembly (such as 202) includes an E-block (such as 222) and a motor for rotating the E-block about a substantially horizontal axis. The E-block (such as 222) supports an actuator arm (such as 224) and a flexure (such as 226) extending from a distal end of the actuator arm (such as 224) in a substantially vertical plane. A servo recording head (such as 204) is mounted to a distal end of the flexure (such as 226) so that the head (such as 204) moves in a substantially vertical plane along an arcuate path adjacent a surface of the disc (such as 108) to record the servo pattern information on the disc surface as the spindle hub assembly (such as 206) rotates the disc (such as 108) and the actuator assembly (such as 202) rotates the E-block (such as 222).

In preferred embodiments of the invention, the servo track writer assembly (such as 200) includes a plurality of discs (such as 108) stacked on the spindle hub assembly (such as 202) and the E-block (such as 222) includes a plurality of actuator arms (such as 224) and attached flexures (such as 226), where each flexure includes a servo recording head (such as 204) to provide simultaneous recording of servo pattern information on each vertically-oriented disc (such as 204). An embodiment of the servo track writer assembly (such as 200) also includes a platform (such as 212) defining a substantially horizontal surface and a slide mechanism (such as 214) coupling the actuator assembly (such as 202) to the platform (such as 212) to allow lateral movement of the actuator assembly (such as 202) along the substantially horizontal surface between a first position wherein the actuator arms (such as 224) engage the discs (such as 204) for writing servo pattern information on the discs, and a second position wherein the plurality of actuator arms (such as 224) are laterally spaced from the plurality of discs (such as 204). A vacuum chuck (such as 208) may be used in one embodiment to secure the actuator assembly (such as 202) in the first position for servo pattern writing. In a further embodiment of the present invention, a comb (such as 232) engages the plurality of flexures (such as 226) to maintain separation between adjacent servo recording heads (such as 204) when the actuator assembly (such as 202) is in the second position, although the comb (such as 232) is removed from contact with the plurality of flexures (such as 226) once the actuator assembly (such as 202) is moved to the first position.

In another exemplary preferred embodiment of the present invention, a method of recording servo pattern information on a disc (such as 108) in a vertically-oriented servo track writer assembly (such as 200) includes the step (such as 500) of positioning the disc (such as 108) on a substantially horizontally-oriented spindle hub assembly (such as 206). The method further includes the step (such as 502) of activating the spindle hub assembly (such as 206) to rotate the disc (such as 108) in a substantially vertical plane. A further step (such as 508) includes pivoting an E-block (such as 222) of an actuator assembly (such as 202) about a substantially horizontal axis to rotate an actuator arm (such as 224) and an attached flexure (such as 226) extending from the E-block (such as 222) along an arcuate path in a substantially vertical plane adjacent a surface of the disc (such as 108). A further step (such as 510) includes signaling a servo recording head (such as 204) attached to a distal end of the flexure (such as 226) to record servo pattern information on the surface of the vertically-oriented disc (such as 108).

In yet a further exemplary preferred embodiment of the present invention, a servo track writer assembly (such as 200) for recording servo pattern information on a disc (such as 108) includes a servo recording head (such as 204) and means for moving the servo recording head (such as 204) in a substantially vertical plane to record servo pattern information on a surface of the disc (such as 108) while rotating the disc in a substantially vertical orientation. In one preferred embodiment, the servo track writer assembly (such as 200) includes means for simultaneously recording servo pattern information on a plurality of discs rotating in a substantially vertical orientation. In a further preferred embodiment, the servo track writer assembly (such as 200) includes means for selectively engaging and disengaging the plurality of servo recording heads (such as 204) from the plurality of discs (such as 108) while the discs rotate in the substantially vertical orientation.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, while twelve discs 108 are shown in FIGS. 2–4, the spindle hub assembly 206 may hold fewer or greater than twelve discs, and in some embodiments may hold just a single disc 108. Similarly, the STW 200 may be used to write both embedded and dedicated servo information on the discs 108. Additionally, while the preferred embodiment of the STW 200 defines a stationary spindle hub assembly 206 and a moveable actuator assembly 202, the present invention encompasses have a stationary actuator assembly and a moveable spindle hub assembly, or even having both assemblies being moveable relative to the stationary platform 212. Furthermore, while specific embodiments of the comb 232 and the interferometer 210 were described above, the present invention encompasses alternative means known to those skilled in the art for both separating the heads 204 on the actuator assembly 202 and for determining the position of the heads 204 during the servo-writing process. Accordingly, all such modifications, changes and alternatives are encompassed in the spirit of the invention disclosed and as defined in the appended claims.

What is claimed is:

1. A servo track writer assembly for recording servo pattern information on a disc comprising:
   a spindle hub assembly having a hub supporting the disc in a substantially vertical plane and a motor for rotating the hub and the supported disc at a predetermined rate about a horizontal axis;
   an actuator assembly having an E-block and a motor for rotating the E-block about another substantially horizontal axis, the E-block supporting an actuator arm and a flexure extending from a distal end of the actuator arm in a substantially vertical plane; and
   a servo recording head mounted to a distal end of the flexure, wherein the servo recording head moves in a substantially vertical plane along an arcuate path adjacent a surface of the disc to record the servo pattern information on the disc surface as the spindle hub assembly rotates the disc and the actuator assembly rotates the E-block.

2. The servo track writer assembly of claim 1 wherein:
   a plurality of discs are stacked on the spindle hub assembly with a predetermined spacing provided between adjacent discs; and
   the E-block includes a plurality of actuator arms and attached flexures, and each flexure includes a servo recording head to provide simultaneous recording of servo pattern information on each vertically-oriented disc surface.

3. The servo track writer assembly of claim 2 further comprising:
   a platform defining a substantially horizontal surface; and
   a slide mechanism coupling the actuator assembly to the platform to allow lateral movement of the actuator assembly along the substantially horizontal surface between a first position wherein the plurality of actuator arms engage the plurality of discs for writing servo pattern information on the discs, and a second position wherein the plurality of actuator arms are laterally spaced from the plurality of discs.

4. The servo track writer assembly of claim 3 further comprising a vacuum chuck secured to the platform for rigidly securing the actuator assembly in the first position for servo pattern writing.

5. The servo track writer assembly of claim 3 further comprising a comb engaging the plurality of flexures to maintain separation between adjacent servo recording heads when the actuator assembly is in the second position, wherein the comb is removed from contact with the plurality of flexures once the actuator assembly is moved to the first position.

6. The servo track writer assembly of claim 5 wherein the second position of the actuator assembly provides sufficient room to load the plurality of discs on and unload the plurality of discs from the spindle hub assembly.

7. A method for recording servo pattern information on a disc in a vertically-oriented servo track writer assembly, the method comprising steps of:
   (a) positioning the disc on a substantially horizontally-oriented spindle hub assembly;
   (b) activating the spindle hub assembly to rotate the disc in a substantially vertical plane;
   (c) pivoting an E-block of an actuator assembly about a substantially horizontal axis to rotate an actuator arm and an attached flexure extending from the E-block along an arcuate path in a substantially vertical plane adjacent a surface of the disc; and
   (d) signaling a servo recording head attached to a distal end of the flexure to record servo pattern information on the vertically-oriented disc surface.

8. The method of claim 7 wherein:
   the positioning step (a) further comprises positioning a plurality of discs on the substantially horizontally-oriented spindle hub assembly;
   the pivoting step (c) rotates a plurality of actuator arms and attached flexures in substantially vertical planes adjacent the plurality of disc surfaces; and
   the signaling step (d) further comprises signaling a plurality of servo recording heads attached to each flexure to record servo pattern information on the plurality of vertically-oriented disc surfaces.

9. The method of claim 8 further comprising a step (e) laterally moving the actuator assembly a support platform between a first position wherein the plurality of actuator arms engage the plurality of discs for writing servo pattern information on the discs, and a second position wherein the plurality of actuator arms are laterally spaced from the plurality of discs.

10. The method of claim 9 further comprising a step (f) of securing the actuator assembly in the first position for servo pattern writing.

11. The method of claim 9 further comprising a step (f) of removing the plurality of discs from the horizontally-oriented spindle hub assembly following the signaling step (d).

12. A servo track writer assembly for recording servo pattern information on a disc comprising:
   a servo recording head; and
   means for moving the servo recording head in a substantially vertical plane to record servo pattern information on a surface of the disc with while rotating the disc in a substantially vertical orientation.

13. The servo track writer assembly of claim 12 further comprising means for simultaneously recording servo pattern information on a plurality of discs.

14. The servo track writer assembly of claim 13 wherein the means for simultaneously recording servo pattern information on the plurality of discs includes:
   means for rotating the plurality of discs in a substantially vertical orientation; and
   means for rotating a plurality of servo recording heads in substantially vertical planes adjacent the plurality of discs.

15. The servo track writer assembly of claim 14 further comprising means for selectively engaging and disengaging the plurality of servo recording heads from the plurality of discs while the discs rotate in the substantially vertical orientation.

* * * * *